(12) United States Patent
Narasimhan

(10) Patent No.: US 8,929,487 B1
(45) Date of Patent: *Jan. 6, 2015

(54) CHANNEL ESTIMATOR FOR UPDATING CHANNEL ESTIMATES AND CARRIER FREQUENCY OFFSETS

(71) Applicant: Marvell International Ltd., Hamilton (BM)

(72) Inventor: Ravi Narasimhan, Los Altos, CA (US)

(73) Assignee: Marvell International Ltd., Hamilton (BM)

( * ) Notice: Subject to any disclaimer, the term of this patent is extended or adjusted under 35 U.S.C. 154(b) by 0 days.
This patent is subject to a terminal disclaimer.

(21) Appl. No.: 14/143,722

(22) Filed: Dec. 30, 2013

Related U.S. Application Data

(60) Continuation of application No. 13/660,580, filed on Oct. 25, 2012, now Pat. No. 8,619,922, which is a continuation of application No. 12/393,547, filed on Feb. 26, 2009, now Pat. No. 8,300,743, which is a division of application No. 11/801,032, filed on May 8, 2007, now Pat. No. 7,532,693, which is a division of application No. 10/067,556, filed on Feb. 4, 2002, now Pat. No. 7,218,691.

(60) Provisional application No. 60/273,487, filed on Mar. 5, 2001.

(51) Int. Cl.
*H04L 27/06* (2006.01)
*H04L 27/26* (2006.01)
*H04L 25/02* (2006.01)

(52) U.S. Cl.
CPC ........ *H04L 27/2659* (2013.01); *H04L 25/0204* (2013.01); *H04L 27/2621* (2013.01)
USPC .......................................................... 375/340

(58) Field of Classification Search
CPC . H04L 27/06; H04L 25/0228; H04L 27/2659; H04L 27/266; H04L 27/2662; H04L 27/2675; H04L 27/2695
USPC .......................................................... 375/340
See application file for complete search history.

(56) References Cited

U.S. PATENT DOCUMENTS

| 4,550,414 A | 10/1985 | Guinon et al. |
| 4,941,155 A | 7/1990 | Chuang et al. |

(Continued)

FOREIGN PATENT DOCUMENTS

| CA | 2064975 | 9/2003 |

OTHER PUBLICATIONS

"Wireless LAN Standard" IEEE Std. 802.11a-1999.

(Continued)

*Primary Examiner* — Juan A Torres

(57) ABSTRACT

A channel estimator for a wireless network receiver. The channel estimator includes a plurality of first circuits, each of the plurality of first circuits configured to multiply a respective channel estimate by a corresponding frequency domain signal, wherein the channel estimates correspond to an orthogonal frequency division multiplexing signal received by the wireless network receiver. A second circuit is configured to output a sum of results of multiplying the respective channel estimates by the corresponding frequency domain signals. A third circuit is configured to calculate, based on the sum, a correction factor, wherein the correction factor corresponds to a complex number representation of the respective channel estimates. A fourth circuit is configured to output, based on the correction factor and a previously calculated channel estimate, an updated channel estimate corresponding to the orthogonal frequency division multiplexing signal received by the wireless network receiver.

16 Claims, 8 Drawing Sheets

(56) References Cited

U.S. PATENT DOCUMENTS

| | | | |
|---|---|---|---|
| 5,053,982 | A | 10/1991 | McCune, Jr. |
| 5,077,753 | A | 12/1991 | Grau, Jr. et al. |
| 5,111,478 | A | 5/1992 | McDonald |
| 5,231,634 | A | 7/1993 | Giles et al. |
| 5,282,222 | A | 1/1994 | Fattouche et al. |
| 5,311,544 | A | 5/1994 | Park et al. |
| 5,555,268 | A | 9/1996 | Fattouche et al. |
| 5,602,835 | A | 2/1997 | Seki et al. |
| 5,608,764 | A | 3/1997 | Sugita et al. |
| 5,625,573 | A | 4/1997 | Kim |
| 5,694,389 | A | 12/1997 | Seki et al. |
| 5,726,973 | A | 3/1998 | Isaksson |
| 5,732,113 | A | 3/1998 | Schmidl et al. |
| 5,802,117 | A | 9/1998 | Ghosh |
| 5,809,060 | A | 9/1998 | Cafarella et al. |
| 5,889,759 | A | 3/1999 | McGibney |
| 5,909,462 | A | 6/1999 | Kamerman et al. |
| 5,953,311 | A | 9/1999 | Davies et al. |
| 5,991,289 | A | 11/1999 | Huang et al. |
| 6,021,110 | A | 2/2000 | McGibney |
| 6,035,003 | A | 3/2000 | Park et al. |
| 6,058,101 | A | 5/2000 | Huang et al. |
| 6,074,086 | A | 6/2000 | Yonge, III |
| 6,075,812 | A | 6/2000 | Cafarella et al. |
| 6,091,702 | A | 7/2000 | Saiki |
| 6,111,919 | A | 8/2000 | Yonge, III |
| 6,125,124 | A | 9/2000 | Junell et al. |
| 6,160,821 | A | 12/2000 | Dolle et al. |
| 6,169,751 | B1 | 1/2001 | Shirakata et al. |
| 6,172,993 | B1 | 1/2001 | Kim et al. |
| 6,414,936 | B1 | 7/2002 | Cho et al. |
| 6,658,063 | B1 | 12/2003 | Mizoguchi et al. |
| 6,711,221 | B1 | 3/2004 | Belotserkovsky et al. |
| 6,754,170 | B1 | 6/2004 | Ward |
| 6,771,591 | B1 | 8/2004 | Belotserkovsky et al. |
| 6,862,297 | B1 | 3/2005 | Gardner et al. |
| 6,874,096 | B1 | 3/2005 | Norrell et al. |
| 7,039,000 | B2 | 5/2006 | You et al. |
| 7,072,381 | B2 | 7/2006 | Atarashi et al. |
| 7,123,662 | B2 | 10/2006 | Li et al. |
| 7,123,670 | B2 | 10/2006 | Gilbert et al. |
| 7,218,691 | B1 | 5/2007 | Narasimhan |
| 7,280,621 | B1 | 10/2007 | Murphy |
| 7,415,059 | B2 | 8/2008 | Chadha et al. |
| 2002/0065047 | A1 | 5/2002 | Moose |
| 2002/0101840 | A1 | 8/2002 | Davidsson et al. |
| 2002/0126618 | A1 | 9/2002 | Kim |
| 2004/0202234 | A1 | 10/2004 | Wang |

OTHER PUBLICATIONS

A high performance frequency and timing synchronization technique for OFDM, Mochizuki, N. et al.; Global Telecommunications Conference, 1998. GLOBECOM 98. The Bridge to Global Integration. IEEE vol. 6, Nov. 8-12, 1998 pp. 3443-3448, vol. 6.

A novel method for blind frequency offset correction in an OFDM system; Visser, M.A. et al; Personal, Indoor and Mobile Radio Communications, 1998. The Ninth IEEE International Symposium; vol. 2, Sep. 8-11, 1998; pp. 816-820.

A synchronization scheme for multi-carrier CDMA systems; Seunghyeon Nahm; Wanyang Sung; Communications, 1998. ICC 98. Conference Record. 1998 IEEE International Conference on vol. 3, Jun. 7-11, 1998, pp. 1330-1334, vol. 3.

Analysis of coarse frequency synchronization for HIPERLAN type-2, Platbrood, F.; Rievers, S.; Farserotu, J.; Vehicular Technology Conference, 1999. VTC 1999—Fall. IEEE VTS 50th, vol. 2, Sep. 19-22, 1999 pp. 688-692, vol. 2.

IEEE Std 802.11b-1999 (Supplement to IEEE Std 802.11-1999 Edition); Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: Higher-Speed Physical Layer Extension in the 2.4 GHz Band; LAN/MAN Standards Committee of the IEEE Computer Society; Sep. 16, 1999 IEEE-SA Standards Board; 96 pages.

Moose, "A technique for orthogonal frequency division multiplexing frequency offset correction" IEEE Transactions on Communications, Oct. 1994 vol. 42, Issue: 10 on pp. 2908-2914.

Schmidl, Timothy M. "Robust Frequency and Timing Synchronization for OFDM" IEEE Transactions on Communications, vol. 45, No. 12, Dec. 1997.

CHANNEL ESTIMATOR FOR UPDATING CHANNEL ESTIMATES AND CARRIER FREQUENCY OFFSETS

CROSS-REFERENCE TO RELATED APPLICATIONS

The present disclosure is a continuation of U.S. patent application Ser. No. 13/660,580 (now U.S. Pat. No. 8,619, 922), filed on Oct. 25, 2012, which is a continuation of U.S. patent application Ser. No. 12/393,547 (now U.S. Pat. No. 8,300,743), filed Feb. 26, 2009, which is a divisional of U.S. patent application Ser. No. 11/801,032 (now U.S. Pat. No. 7,532,693), filed May 8, 2007, which is a divisional of U.S. patent application Ser. No. 10/067,556 (now U.S. Pat. No. 7,218,691), filed Feb. 4, 2002, which claims the benefit of U.S. Provisional Application No. 60/273,487, filed Mar. 5, 2001. The entire disclosures of the applications referenced above are incorporated herein by reference.

FIELD OF THE INVENTION

The present invention relates to receivers, and more particularly to receivers that measure carrier frequency offset, symbol timing and/or phase noise of an orthogonal frequency division multiplexing signal.

BACKGROUND OF THE INVENTION

A wireless local area network (WLAN) uses radio frequency (RF) signals to transmit and receive data between electronic devices. WLANs provide all of the features and benefits of traditional hard-wired LANs without requiring cable connections between the devices. In WLANs, transmitters and receivers (often implemented as wireless network interface cards) provide a wireless interface between a client and a wireless access point to create a transparent connection between the client and the network. Alternately, the WLAN provides a wireless interface directly between two devices.

The access point is the wireless equivalent of a hub. The access point is typically connected to the WLAN backbone through a standard Ethernet cable and communicates with the wireless devices using an antenna. The wireless access point maintains the connections to clients that are located in a coverage area of the access point. The wireless access point also typically handles security by granting or denying access.

IEEE section 802.11(a), which is hereby incorporated by reference, standardized WLANs that operate at approximately 5 GHz with data speeds up to 54 Mbps. A low band operates at frequencies from 5.15 to 5.25 GHz with a maximum power output of 50 mW. A middle band operates at frequencies from 5.25 to 5.35 GHz with a maximum power output of 250 mW. A high band operates at frequencies from 5.75 to 5.85 GHz with a maximum power output of 1000 mW.

Because of the high power output, wireless devices operating in the high band will tend to include building-to-building and outdoor applications. The low and middle bands are more suitable for in-building applications. IEEE section 802.11(a) employs orthogonal frequency division multiplexing (OFDM) instead of direct sequence spread spectrum (DSSS) that is employed by IEEE section 802.11(b). OFDM provides higher data rates and reduces transmission echo and distortion that are caused by multipath propagation and radio frequency interference (RFI).

Referring now to FIG. 1, data packets include a preamble 10 that is specified by IEEE section 802.11(a). The preamble 10 includes a plurality of short training symbols 12 (S0, . . . , S9). The short training symbols 12 are followed by a guard interval 14 (Guard) and two long training symbols 16-1 and 16-2 (L0, L1). The duration of the short training symbol 12 is $T_{short}$, the duration of the guard interval 14 is $T_{G12}$, the duration of the long training symbols 16 is $T_{long}$, the duration of the guard interval 15 for data symbols is $T_{G1}$, and the duration of data symbols 18 is $T_{data}$. Guard intervals 15 and data symbols 18 alternate after the long training symbols 16. According to IEEE section 802.11(a), $T_{short}$=0.8 μs, $T_{GI}$=0.8 μs, $T_{GI2}$=1.6 μs, $T_{long}$=3.2 μs, and $T_{data}$=4 μs.

One important task of the OFDM receiver is the estimation of symbol timing and carrier frequency offset. Symbol timing is needed to determine the samples of each OFDM symbol that correspond to the guard interval and the samples that are used for fast Fourier transform (FFT) processing. Compensation of the carrier frequency offset is also needed to maximize signal amplitude and minimize inter-carrier interference (ICI).

Conventional symbol timing circuits correlate two halves of a single OFDM training symbol whose duration is equal to the duration of the data symbols. For example, see the symbol timing circuit disclosed in T. Schmidl and D. C. Cox, "Robust Frequency and Timing Synchronization for OFDM," IEEE Trans. Commun., vol. 45, no. 12, (December 1999), pp. 1613-1621, which is hereby incorporated by reference. The conventional symbol timing circuit exhibits a plateau when there is no intersymbol interference (ISI). The duration of the plateau is the duration of the guard interval that is not affected by ISI. The plateau in the conventional symbol timing circuit corresponds to the range of acceptable times for the start of the frame. For example, the center of the plateau is a desirable estimate of the symbol timing. Since only one training symbol is employed, the conventional symbol timing circuit does not allow time for possible switching of antennas and corresponding automatic gain control (AGC) settling during packet detection.

SUMMARY OF THE INVENTION

A system and method according to the invention estimates carrier frequency offset in an orthogonal frequency division multiplexing receiver of a wireless local area network. Short training symbols of a preamble of a data packet are sampled to generate a received signal. Sign bits of real and imaginary components of the received signal are quantized.

In other features, the sign bits of at least two adjacent short training symbols are used to generate a correlation signal. A filtered sum of an absolute value of a real component of the correlation signal and an absolute value of an imaginary component of the correlation signal are generated.

In still other features, a local maximum value of the filtered sum is identified during the short training symbols. The local maximum value is identified by updating and storing the filtered sums and by comparing at least one filtered sum to a prior filtered sum and to a subsequent filtered sum.

In still other features, the local maximum value of the filtered sum is multiplied by a threshold value to identify a right edge of a plateau. A right time index value corresponding to the right edge is identified. Symbol timing of long training symbols is calculated from the right time index value.

In still other features, a maximum value of the filtered sum is identified during the short training symbols. The maximum value is identified by updating and storing the filtered sums and by comparing at least one filtered sum to a prior filtered sum and to a subsequent filtered sum. A time index value corresponding to the maximum value is identified. A correlation signal value corresponding to the time index value is identified. An imaginary component of the correlation signal value corresponding to the time index value is calculated. A real component of the correlation signal value corresponding to the time index value is calculated. The imaginary component is divided by the real component to generate a quotient. An arctangent of the quotient is calculated to generate a coarse carrier frequency offset estimate.

In other features of the invention, a system and method estimates fine carrier frequency offset in an orthogonal frequency division multiplexing receiver of a wireless local area network. A symbol timing estimate is generated that identifies a start time of first and second long training symbols of a preamble of a data packet. The first and second long training symbols of the preamble are used to generate a received signal. The first and second long training symbols are correlated to generate a correlation signal. A fine carrier frequency offset is calculated from the correlation signal.

In yet other features, the step of calculating includes calculating imaginary and real components of the correlation signal. The imaginary component is divided by the real component to generate a quotient. An arctangent of the quotient is calculated to generate the fine carrier frequency offset estimate.

In other features of the invention, a system and method updates channel estimates in an orthogonal frequency division multiplexing receiver of a wireless local area network. The channel estimates are generated for an orthogonal frequency division multiplexing subcarrier as a function of subcarrier index values. A complex number is generated by summing a product of frequency domain signals and the channel estimates for each of the subcarrier index values and dividing the sum by a sum of a squared absolute value of the channel estimate for each of the subcarrier index values. The complex number is multiplied by the channel estimates to generate said updated channel estimates.

In still other features of the invention, a system and method adapt a carrier frequency offset estimate in an orthogonal frequency division multiplexing receiver of a wireless local area network. Channel estimates are generated for an orthogonal frequency division multiplexing subcarrier as a function of subcarrier index values. A complex number is generated by summing a product of frequency domain signals and the channel estimates for each of the subcarrier index values. The sum is divided by a sum of a squared absolute value of the channel estimate for each of the subcarrier index values. An imaginary component of the complex number is calculated.

In yet other features, the imaginary component is multiplied by an adaptation parameter to generate a product. The product is added to a carrier frequency offset estimate to produce an adapted carrier frequency offset estimate.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
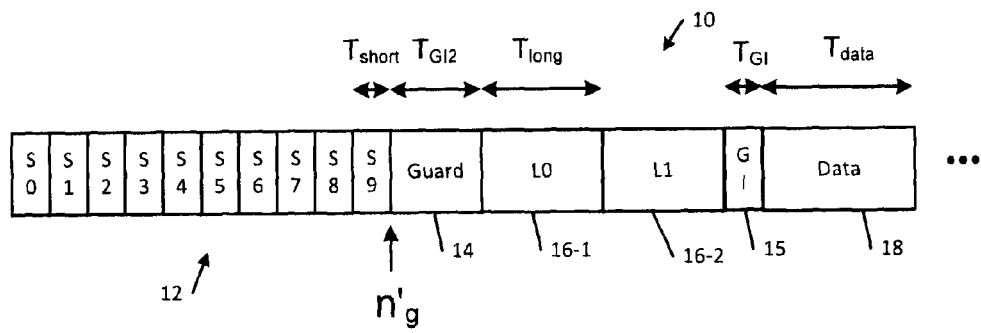
FIG. 1 illustrates a preamble of a packet transmitted by an orthogonal frequency division multiplexing receiver according to the prior art.
Figure 2:
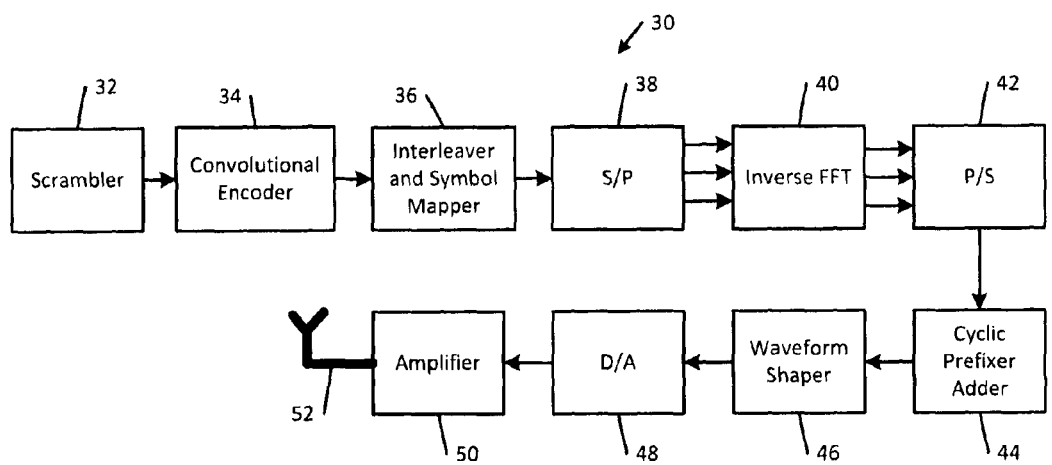
FIG. 2 is a functional block diagram of an OFDM transmitter according to the present invention.

Referring now to FIG. 2, an OFDM transmitter 30 is shown. The OFDM transmitter 30 includes a data scrambler 32 that receives input bits and scrambles the bits to prevent long strings of 1's and 0's. An output of the data scrambler 32 is input to a convolutional encoder 34 that adds redundant bits. For example, for each input bit the convolutional encoder 34 may generate two output bits in a rate ½ convolutional coder. Skilled artisans can appreciate that other code rates may be employed. An output of the convolutional encoder 34 is input to an interleaver and symbol mapper 36.

An output of the interleaver and symbol mapper 36 is input to a serial to parallel (S/P) converter 38. Outputs of the S/P converter 38 are input to an inverse fast Fourier transform (FFT) circuit 40. Outputs of the inverse FFT circuit 40 are input to a parallel to serial (P/S) converter 42. An output of the P/S converter 42 is input to a cyclic prefix adder 44 that adds guard interval bits. An output of the cyclic prefix adder 44 is input to a waveform shaper 46. An output of the waveform shaper 46 is input to a digital to analog (D/A) converter 48. An output of the D/A converter 48 is input to a radio frequency (R/F) amplifier 50 that is connected to an antenna 52. In a preferred embodiment, the OFDM transmitter 30 complies with IEEE section 802.11(a).

Figure 3:
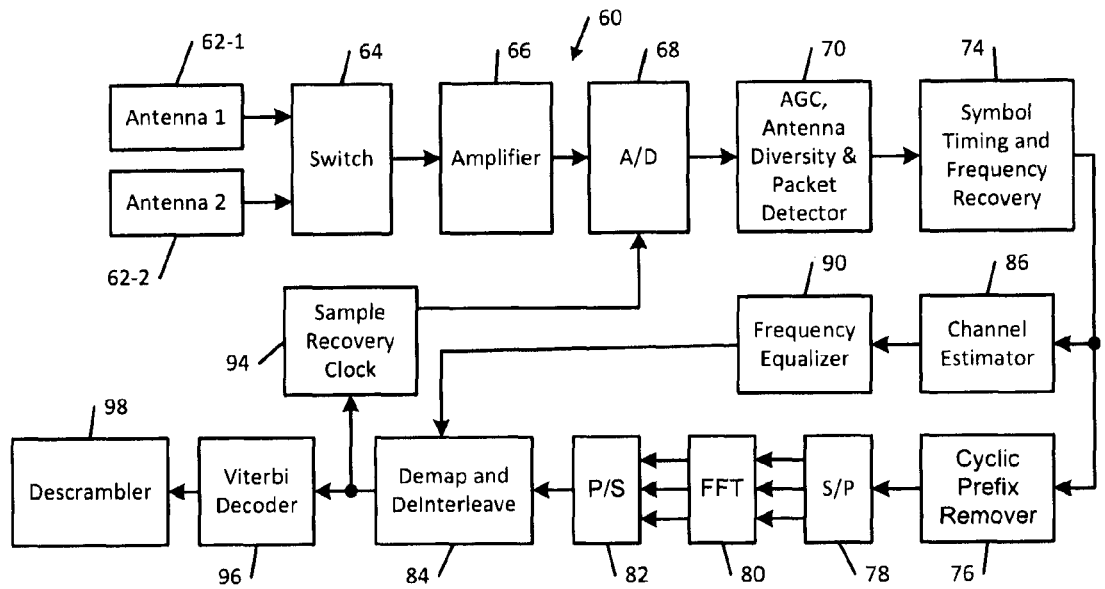
FIG. 3 is a functional block diagram of an OFDM receiver according to the present invention.

Referring now to FIG. 3, an OFDM receiver 60 receives the RF signals that are generated by the OFDM transmitter 30. The receiver 60 includes antennas 62-1 and 62-2. A switch 64 selects one of the antennas 62 based upon the strength of the RF signal detected by the antenna 62. An amplifier 66 is connected to an output of the switch 64. An analog to digital (A/D) converter 68 is connected to an output of the amplifier 66. An automatic gain control (AGC), antenna diversity and packet detection circuit 70 is connected to an output of the A/D converter 68. When the gain of the AGC decreases, a packet is detected. A symbol timing and carrier frequency offset circuit 74 according to the present invention is connected to an output of the circuit 70. The symbol timing and carrier frequency offset circuit 74 identifies a carrier frequency offset $\omega_\Delta$, a starting time $n_g$ of a guard interval, and phase noise as will be described more fully below. The circuit 74 typically multiples the samples by $e^{-j\omega_\Delta n}$ where n is a sample time index.

A cyclic prefix remover 76 is connected to an output of the symbol timing and carrier frequency offset circuit 74. A S/P converter 78 is connected to an output of the cyclic prefix remover 76. A FFT circuit 80 is connected to an output of the S/P converter 78. A P/S converter 82 is connected to an output of the FFT circuit 80. A demap and deinterleave circuit 84 is connected to an output of the P/S converter 82.

A channel estimator 86 that estimates multipath is connected to an output of the symbol timing and carrier frequency offset circuit 74. A frequency equalizer (FEQ) 90 is connected to an output of the channel estimator 86. An output of the FEQ 90 is input to the demap and deinterleave circuit 84. An output of the demap and deinterleave circuit 84 is input to a sample recovery clock 94 and to a Viterbi decoder 96. An output of the sample recovery clock 94 is input to the A/D converter 68. An output of the Viterbi decoder 96 is input to a descrambler 98.

Figure 4:
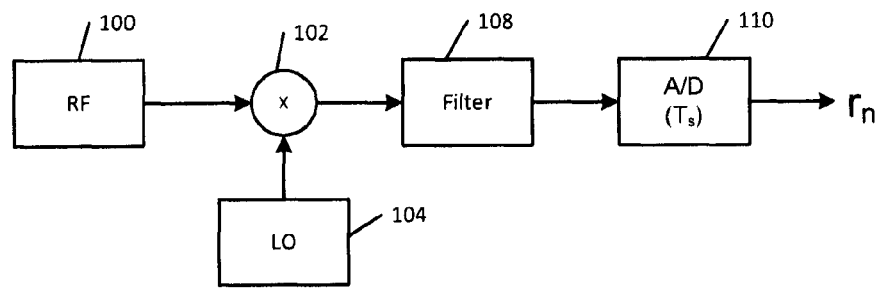
FIG. 4 is a simplified functional block diagram of the OFDM receiver of FIG. 3.

Referring now to FIG. 4, a simplified functional block diagram of FIG. 3 is shown and includes a radio frequency (RF) amplifier 100 that amplifies the received RF signal. An output of the amplifier 100 is input to a multiplier 102 having another input connected to a local oscillator (LO) 104. An output of the multiplier 102 is filtered by a filter 108 and input to an analog to digital (A/D) converter 110 having a sampling rate of $1/T_s$. The A/D converter 110 generates samples $r_n$. A typical value for $1/T_s$ is 20 MHz, although other sampling frequencies may be used. During the initial periods of the short training symbol 12, the circuit 70 brings the signal within a dynamic range of the OFDM receiver 60. Antenna selection for receive diversity is also performed.

After packet detection and AGC settling, the following quantities are computed for estimation of OFDM symbol timing:

$$q_n = \text{sgn}[\Re(r_n)] + j\text{sgn}[\Im(r_n)]$$

$$P_n = \sum_{m=1}^{L} q^*_{n+m-2L} q_{n+m-L}$$

$$M_n = \alpha_s M_{n-1} + (1-\alpha_s)(|\Re(P_n)| + |\Im(P_n)|)$$

Where $L=T_{short}/T_s$ is the number of samples in one short training symbol, $\Re$ is a real component of an argument, and $\Im$ is an imaginary component of the argument. A typical value for L is L=16, although other values may be used. $q_n$ contains sign bits of real and imaginary components of the received signal $r_n$. Quantization simplifies the hardware processing for symbol timing acquisition. $P_n$ represents a correlation between two adjacent short training symbols of $q_n$. $M_n$ represents a filtered version of $|\Re(P_n)|+|\Im(P_n)|$. The filter is preferably a single pole filter with a pole $\alpha_s$. A typical value of $\alpha_s$ is $\alpha_s=1-3/32$, although other values may be used.

Figure 5:
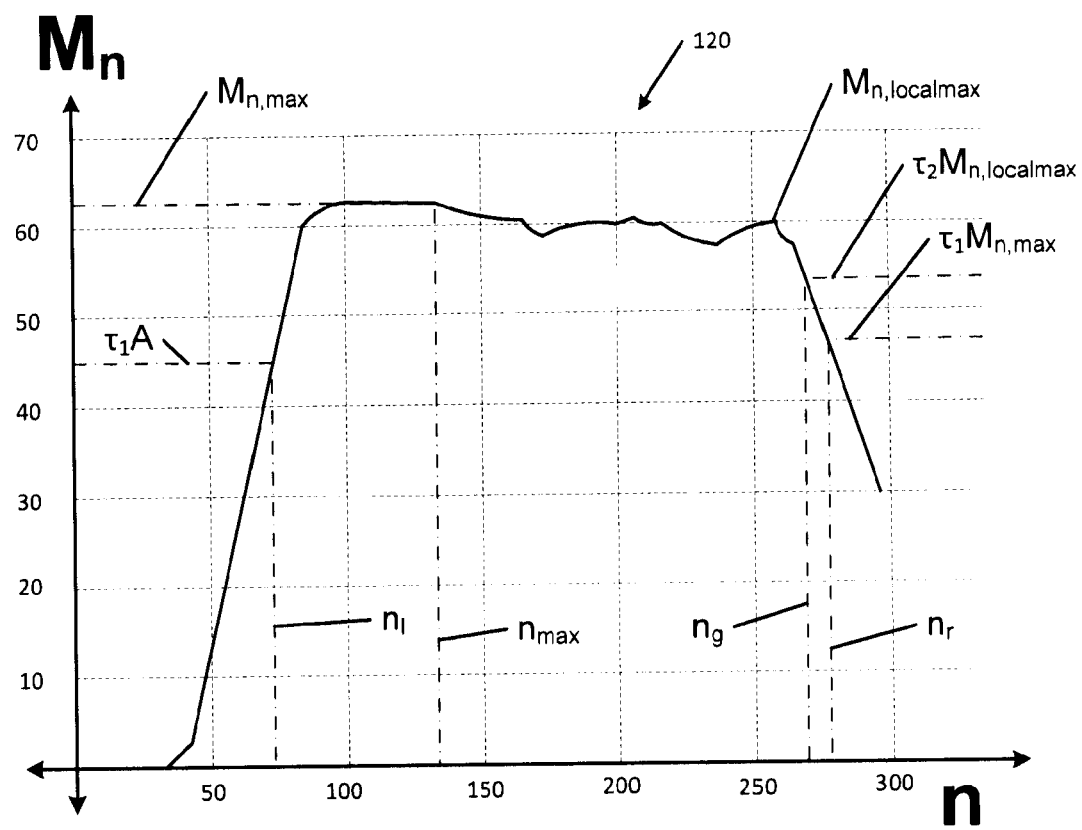
FIG. 5 is a graph illustrating $M_n$ as a function of a time interval n.

Referring now to FIG. 5, a plot of $M_n$ for a multipath channel having a delay spread of 50 ns is shown. $M_n$ has a plateau at 120 that results from the periodicity of the channel output due to the repetition of the short training symbols. The duration of the plateau depends on the number of periods of the short training symbol that remain after antenna selection and AGC settling. Therefore, a center of the plateau is not the best symbol timing estimate. A falling edge of the plateau indicates that no more short training symbols are present and that $M_n$ includes samples from the guard interval 14 that precedes the long training symbols 16. Therefore, the falling edge of the plateau provides an estimate of the symbol timing.

After AGC settling, $P_n$ and $M_n$ are calculated. A left edge $n_l$ of the plateau 120 is defined by $M_n > \tau_1 A$. Typical values for $\tau_1$ and A are $\tau_1=0.7$ and $A=32/(T_s \cdot 20 \text{ MHz})$. A maximum value of $M_n$ is updated and stored as $M_{n,max}$ as time progresses. The complex number $P_n$ corresponding to $M_{n,max}$ is P denoted by $P_{n,max}$, which is also updated and stored as time progresses. A local maximum value $M_{n,localmax}$, is set equal to $M_{n-1}$ if the following conditions are met: $M_{n-1} \geq M_{n-2}$ and $M_{n-1} > M_n$. The local maximum value $M_{n,localmax}$ is updated and stored as time progresses.

A time index $n_g$ is set to n−1 if the following conditions are met: $M_n < \tau_2 M_{n,localmax}$ and $M_{n-1} \geq \tau_2 M_{n,localmax}$. The index $n_g$ is used to determine the symbol timing. A typical value for $\tau_2$ is $\tau_2=0.9$. To determine a right edge $n_r$ of the plateau 120, $M_n$ must stay below $\tau_1 M_{n,max}$ for at least B consecutive samples. A typical value for B is $B=8/(T_s \cdot 20 \text{ MHz})$. Once $n_r$ is determined, the coarse frequency offset $\omega_\Delta$ is determined by:

$$\omega_\Delta = \tan^{-1}[\Im(P_{n,max})/\Re(P_{n,max})]/(L)$$

A coarse frequency correction $e^{-j\omega_\Delta n}$ is applied to the received signal. The symbol timing is then estimated by $n_g'=n_g-n_\Delta$. A typical value for $n_\Delta$ is $n_\Delta=32$.

Figure 6:
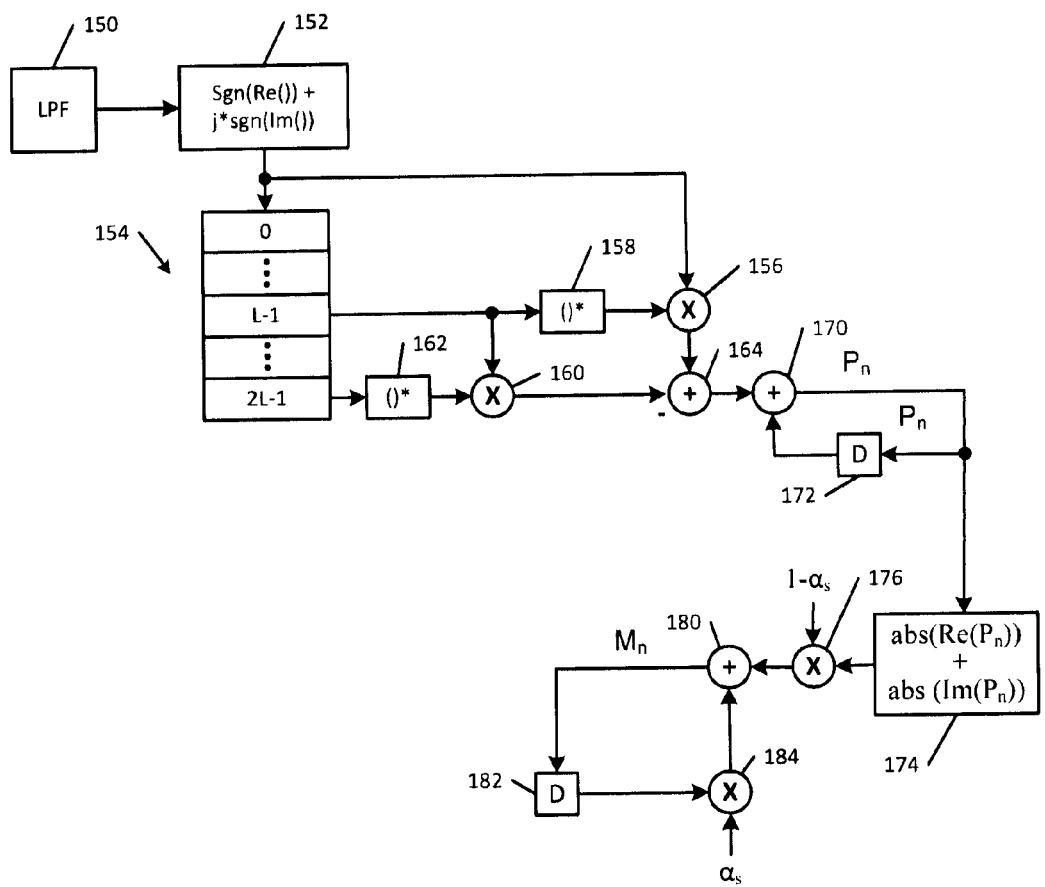
FIG. 6 is an exemplary functional block diagram for calculating $M_n$ and $P_n$.
Figure 7:
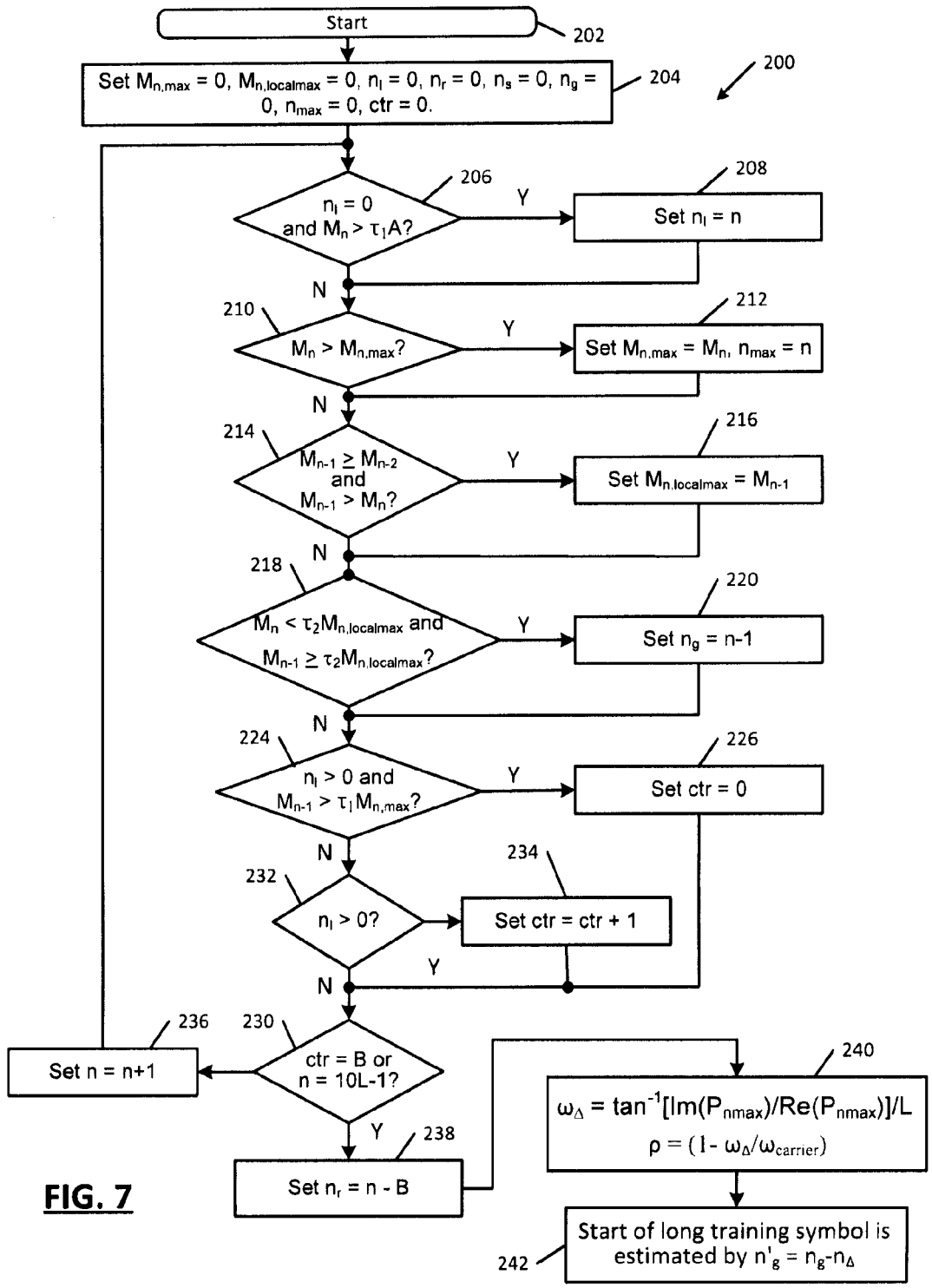
FIG. 7 is a flowchart illustrating steps for calculating symbol timing, carrier frequency offset and phase noise.

Referring now to FIGS. 6 and 7, an exemplary implementation of the coarse frequency and symbol timing circuit 70 is shown. Typical parameter values include L=32, $\tau_1=0.7$, A=64, $\tau_2=0.7$, B=15, $n_\Delta=25$, $T_s=40$ MHz, and $\alpha_s=1-3/32$. A low pass filter (LPF) 150 is connected to a sign-bit quantizer 152. The sign-bit quantizer 152 is connected to a buffer 154 and a multiplier 156. An L−1 output of the buffer 154 is connected to a conjugator 158 and a multiplier 160. A 2L−1 output of the buffer 154 is connected to a conjugator 162, which has an output connected to the multiplier 160. An output of the multiplier 160 is connected to an inverting input of an adder 164. An output of the multiplier 156 is connected to a non-inverting input of the adder 164. An output of the adder 164 is input to an adder 170. An output of the adder 170 is equal to $P_n$ and is connected to a delay element 172 that is fed back to an input of the adder 170. The output of the adder 170 is also input to a metric calculator 174.

An output of the metric calculator 174 is connected to a multiplier 176. Another input of the multiplier is connected to a signal equal to $1-\alpha_s$. An output of the multiplier is input to an adder 180. An output of the adder 180 is equal to $M_n$ and is connected to a delay element 182, which has an output that is connected to a multiplier 184. The multiplier 184 has another input connected to $\alpha_s$. An output of the multiplier 184 is connected to an input of the adder 180.

Referring now to FIG. 7, steps performed by the coarse frequency circuit and symbol timing circuit 74 is shown generally at 200. Control begins in step 202. In step 204, $M_{nmax}$, $M_{nlocalmax}$, $n_l$, $n_r$, $n_s$, $n_g$, $n_{max}$, and ctr are initialized. In step 206, control determines whether $n_l=0$ and $M_n > \tau_1 A$. If true, control sets $n_l=n$ in step 208 and continues with step 210. If false, control determines whether $M_n > M_{nmax}$. If true, control continues with step 212 where control sets $M_{nmax}=M_n$ and nmax=n and then continues with step 214. If false, control continues with step 214 where control determines whether both $M_{n-1} > M_{n-2}$ and $M_{n-1} > M_n$.

If true, control sets $M_{nlocalmax}=M_{n-1}$ and then continues with step 216. If false, control determines whether $M_n < \tau M_{nlocalmax}$ and $M_{n-1} \geq \tau \tau_2 M_{nlocalmax}$ in step 218. If true, control sets $n_g=n-1$ in step 220 and continues with step 224. If false, control determines whether $n_l>0$ and $M_{n-1} > \tau_1 M_{nmax}$ in step 224. If true, control sets ctr=0 in step 226 and continues with step 230.

If false, control determines whether $n_l>0$ in step 232. If true, control sets ctr=ctr+1 in step 234 and continues with step

230. In step 230, control determines whether ctr=B or n=10L−1. If false, control sets n=n+1 in step 236 and returns to step 206. If true, control sets $n_r$=n−B in step 238. In step 240, control calculates $w_\Delta$=tan$^{-1}$ [Im($P_{nmax}$)/Re($P_{nmax}$)]/(L) and p=(1<$\omega_\Delta/\omega_{carrier}$). In step 242, control estimates a start of long training symbol using $n_g'=n_g-n_\Delta$.

IEEE section 802.11(a) specifies that the transmit carrier frequency and sampling clock frequency are derived from the same reference oscillator. The normalized carrier frequency offset and the sampling frequency offset are approximately equal. Since carrier frequency acquisition is usually easier than sampling period acquisition, sampling clock recovery is achieved using the estimate of the carrier frequency offset $\omega_\Delta$.

The coarse frequency estimate $\omega_\Delta$ is used to correct all subsequent received samples. The coarse frequency estimate $\omega_\Delta$ is refined during the long training symbols specified in IEEE section 802.11(a). $r_{0,n}$ and $r_{1,n}$ (n=0, ..., N−1) are the received samples that are associated with the long training symbols 16-1 and 16-2 (or L0 and L1), respectively. The value N is the number of samples contained within each long training symbol 16. A typical value for N is N=64 (for 1/$T_s$=20 MHz) (where L=16 and $n_\Delta$=32). The estimate of fine frequency offset $w_{\Delta,fine}$ is obtained by:

$$\omega_{\Delta,fine} = \tan^{-1}[\Im(C_L)/\Re(C_L)]$$

where $$C_L = \sum_{n=1}^{N-1} r_{0,n}^* r_{1,n}$$

The sampling clock is also updated accordingly.

The residual frequency offset and phase noise are tracked during the data portion of the OFDM packet. $\hat{H}_k$ are channel estimates for the OFDM subcarriers as a function of the subcarrier index k. The channel estimates $\hat{H}_k$ are multiplied by a complex number $\hat{C}_{ML}$ to compensate for common amplitude and phase error due to the residual frequency offsets and phase noise. Pk, k∈K, are received frequency domain signals on the pilot tones after the known BPSK modulation is removed, where K={−21, −7, 7, 21}. The pilot tones are used to derive a maximum likelihood estimate of $\hat{C}_{ML}$:

$$\hat{C}_{ML} = \frac{\sum_{k \in K} \hat{H}_k^* P_k}{\sum_{k \in K} |\hat{H}_k|^2}$$

The new channel estimates are then $\tilde{H}_k=\hat{C}_{ML}\hat{H}_k$. These updated channel estimates are used in the frequency equalizer (FEQ) for data detection.

The carrier frequency estimate $\omega_\Delta$ is adapted by:

$$\omega_\Delta^l = \omega_\Delta^{l-1} + \beta \Im(\hat{C}_{ML})$$

where β is an adaptation parameter and the subscript l represents values during the l-th OPDM data symbol. A typical value of β is β=1/1024. The sampling clock frequency is also adapted accordingly.

Since the guard interval 14 of an OFDM data symbol is longer than the channel impulse response, an additional tolerance factor is provided in the symbol timing estimate. In order to obtain a symbol timing estimate within an acceptable range, a modified symbol timing estimate $n_g'$ is generated. The modified symbol timing estimate $n_g'$ is equal to $n_g-n_\Delta$ where $n_\Delta$. A typical value for $n_\Delta$ is $n_\Delta$=32 when L=16.

Figure 8:
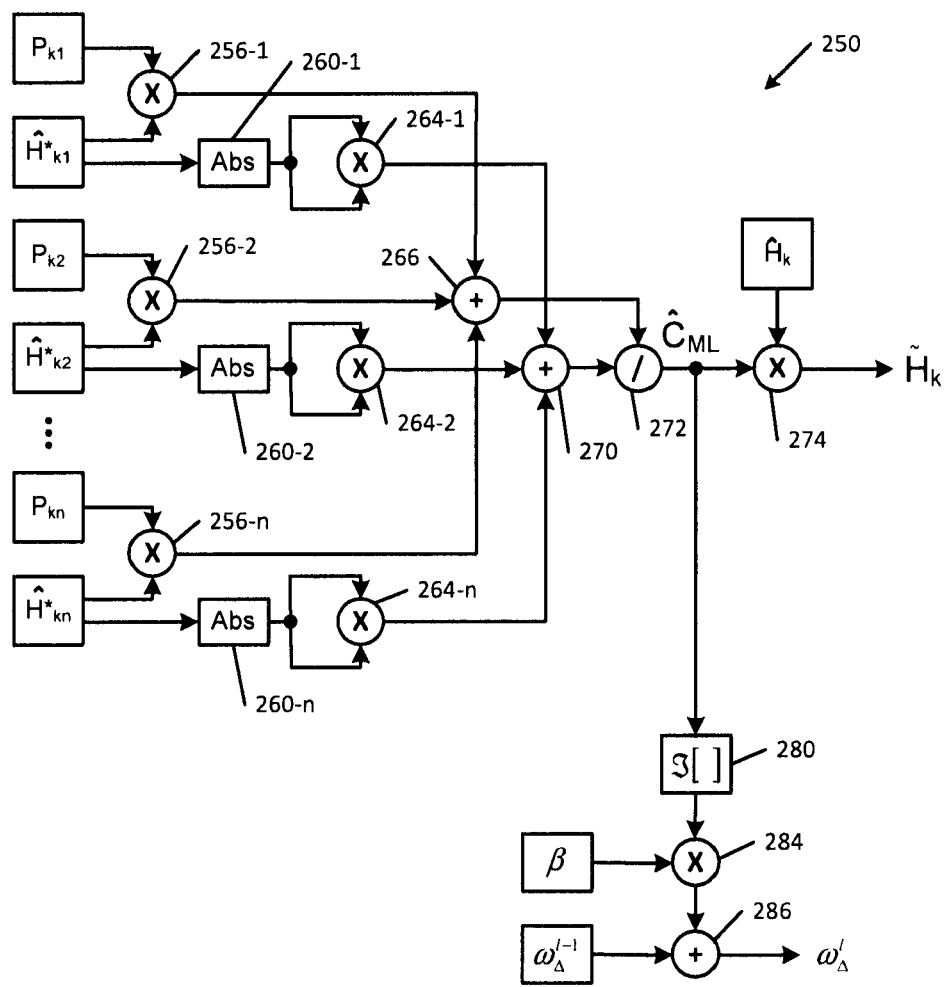
FIG. 8 is an exemplary functional block diagram for calculating updated channel estimates and an adapted carrier frequency estimate.

Referring now to FIG. 8, an exemplary circuit 250 for calculating the updated channel estimates and the adapted carrier frequency estimate ωΔ is shown. The circuit includes multipliers 256-1, 256-2, ..., 256-n that multiply $\hat{H}_k^*$ and Pk, for k∈K. Absolute value circuits 260-1, 260-2, ... 260-n calculate an absolute value of $\hat{H}_k$. Outputs of the absolute value circuit 260 are squared by multipliers 264-1, 264-2, ..., 264-n. Outputs of the multipliers 256 are input to an adder 266. Outputs of the multipliers 264 are input to an adder 270. An output of the adder 266 is input to a numerator input of a divider 272. An output of the adder 270 is input to a denominator input of the divider 272. An output of the divider 272 $\hat{C}_{ML}$ is input to a multiplier 274. Another input of the multiplier 274 is connected to $\hat{H}_k$. An output of the multiplier 274 generates $\tilde{H}_k$.

An output of the divider 272 is input to an imaginary component circuit 280 that outputs an imaginary component of $\hat{C}_{ML}$. An output of the imaginary component circuit 280 is input to a multiplier 284. Another input of the multiplier is connected to the adaptation parameter β. An output of the multiplier 284 is input to an adder 286. Another input of the adder is connected to $\omega_\Delta^{l-1}$. An output of the adder 286 generates $\omega_\Delta^l$ which is the adapted carrier frequency estimate.

Figure 9:
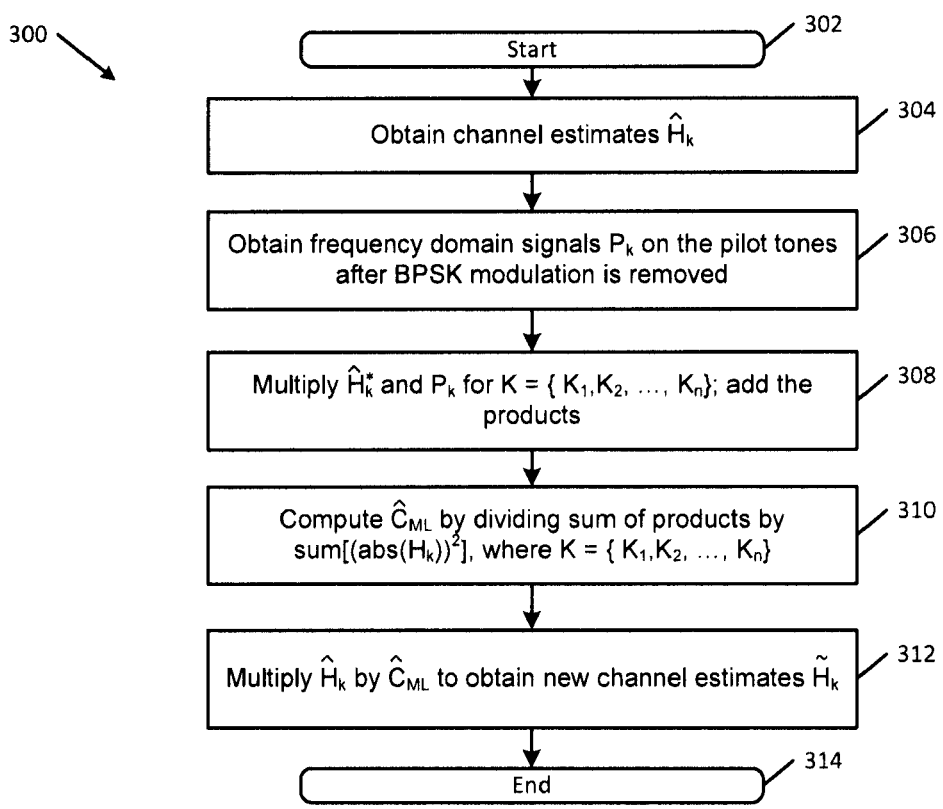
FIG. 9 is a flowchart illustrating steps for calculating the updated channel estimates.

Referring now to FIG. 9, steps for calculating new channel estimates are shown generally at 300. In step 302, control begins. In step 304, channel estimates $\hat{H}_k$ are obtained. In step 306, frequency domain signals Pk on the pilot tones are obtained after BPSK modulation is removed. In step 308, the conjugates of the channel estimates $\hat{H}_k$ are multiplied by the frequency domain signals Pk and summed for each value of K. In step 310, $\hat{C}_{ML}$ is computed by dividing the summed product generated in step 308 and divided by the sum for each value of k of the squared absolute values of $\hat{H}_k$. In step 312, the channel estimates $\hat{H}_k$ are multiplied by $\hat{C}_{ML}$ to obtain new channel estimates $\tilde{H}_k$. Control ends in step 314.

Figure 10:
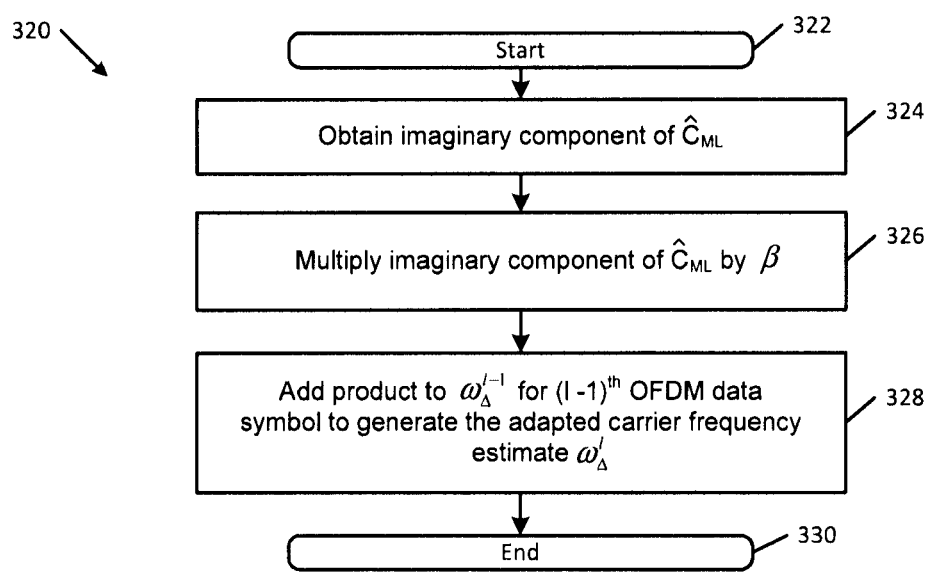
FIG. 10 is a flowchart illustrating steps for calculating the adapted carrier frequency estimate.

Referring now to FIG. 10, steps for generating the adapted carrier frequency estimate are shown generally at 320. Control begins in step 322. In step 324, the imaginary component of $\hat{C}_{ML}$ is generated. In step 326, the imaginary component of $\hat{C}_{ML}$ is multiplied by the adaptation parameter β. In step 328, the product of step 326 is added to $\omega_\Delta^{l-1}$ (the l-1th carrier frequency offset estimate) to generate $\omega_\Delta^l$. Control ends in step 330.

In an alternate method for calculating coarse frequency according to the present invention, after packet detection and AGC settling, the following quantities are computed for estimation of OFDM symbol timing:

$$P_n = \sum_{m=1}^{L} r_{n+m-2L}^* r_{n+m-L}$$

$$R_n = \sum_{m=1}^{L} |r_{n+m-L}|^2$$

$$M_n = |P_n|^2 / R_n^2$$

Where L=$T_{short}/T_s$ is the number of samples in one short training symbol. A typical value for L=16, although other values may be used. $P_n$ represents a correlation between two adjacent short training symbols. $R_n$ represents an average received power in a short training symbol. $M_n$ represents a normalized correlation between two adjacent short training symbols.

$M_n$ exhibits the plateau at 120 due to the repetition of the short training symbol. In other words, $M_n$ is a maximum value as a sample window moves across the short training symbols 12 after packet detection and AGC settling. $P_n$ correlates received signals for two adjacent short training samples. Preferably, the sampling window has a duration of 2L, although other durations are contemplated.

The duration of the plateau 120 depends upon the number of periods of the short training symbol that remain after antenna selection and AGC settling is complete. Therefore, the center of the plateau 120 of $M_n$ is not usually the best symbol timing estimate. The right edge of the plateau 120 indicates that no more short training symbols are present. Samples that occur after the right edge of the plateau include samples from the guard interval 14 that precedes the long training symbols 16. Therefore, the right edge of the plateau 120 provides a good estimate of the symbol timing.

After packet detection and AGC settling, $M_n$ is computed. $M_{max}$ is the maximum of $M_n$ and $n_{max}$ corresponds to a time index at which $M_{max}$ occurs. Points $n_l$ and $n_r$ are left and right edges of the plateau 120, respectively. The points $n_l$ and $n_r$ are identified such that $M_{nl} \approx M_{nr} \approx \tau_1 M_{max}$ and $n_l < n_{max} < n_r$. In other words, $n_l$ and $n_r$ are the points preceding and following the maximum of $M_n$ that are equal to a threshold $\tau_1$ multiplied by $M_{max}$. A typical value for $\tau_1$ is 0.7. The center of the plateau 120 is estimated by the midpoints $n_c = (n_r + n_l)/2$.

The carrier frequency offset $\Delta f$ is estimated by:

$$\alpha = \tan^{-1}[\Im(P_{nc})/\Re(P_{nc})]$$

$$\Delta f = \alpha/(2\pi T_{short}) \text{ which is valid if } |\Delta f| < 1/(2T_{short}).$$

For example, $|\Delta| < 1/(2T_{short}) = 625$ kHz for $T_{short} = 0.8$ µs. The estimate of the carrier frequency offset $\Delta f$ may be refined using a correlation of the two long training symbols after the sample timing is determined as will be described below.

In order to detect the falling edge of the plateau of $M_n$, the mean absolute difference of $M_n$ near the center of the plateau is computed:

$$D_K = (1/K) \sum_{n=n_c-(K/2)+1}^{n_c+(K/2)} |M_n - M_{n-1}|$$

Where K is the number of terms in the estimate of the mean absolute difference. A typical value for K is $(n_r - n_l)/2$. The sample index $n_g$ at the beginning of the guard interval 14 preceding the long training symbols 16 is estimated by detecting the right or following edge of the plateau of $M_n$. In other words, $n_g$ satisfies the following conditions:

$$n_g > n_c$$

$$M_{n_g} < M_{n_g-1}$$

$$|M_{n_g} - M_{n_g-1}| > \tau_2 D_K$$

$$n_g' = n_g - n_\Delta$$

A typical value for $\tau_2$ is 10.

Since the guard interval 14 of an OFDM data symbol is longer than the channel impulse response, an additional tolerance factor is provided in the symbol timing estimate. In order to obtain a symbol timing estimate within an acceptable range, a modified symbol timing estimate $n_g'$ is generated. The modified symbol timing estimate $n_g'$ is equal to $n_g - n_\Delta$ where $n_\Delta$ is a small number that is less than the number of samples in the guard interval for a data symbol. For IEEE 802.11(a), the number of samples in the guard interval for a data symbol is L, which is the number of samples in a short training symbol. For example, a typical value for $n_\Delta$ is L/4.

The identification of the precise time that $M_n$ decreases from the plateau 120 (e.g. when the short training symbols 12 end) may vary somewhat. To accommodate the possible variation, the modified symbol timing estimate $n_g'$ provides additional tolerance. With the modified symbol timing estimate $n_g'$, a sampling window begins earlier in the guard interval 14.

IEEE section 802.11(a) specifies that the transmit frequency and sample clock frequency are derived from the same reference oscillator. Therefore, the normalized carrier frequency offset and sampling period offset are approximately equal. Since carrier frequency acquisition is more simple than sampling period acquisition, sampling clock recovery is achieved using the estimate of the carrier frequency offset.

The initial carrier frequency offset estimate $\Delta f_0$ is obtained during the short timing symbols 12 in the preamble 10 of each packet as previously described above. Each complex output sample of the A/D converter 68 is adjusted using a current carrier frequency offset estimate M. If the original sampling period (before acquisition) is equal to $T^{orig}$, the first update of the sampling period is:

$$T_0 = T^{orig}(1 - (\Delta f_0/f_{nominal})).$$

Where $f_{nominal}$ is the nominal carrier frequency. The estimate of the carrier frequency offset during the long training symbols 16 is used to obtain $\Delta f_1 = \Delta f_0 + \epsilon_1$. The corresponding update of the sampling period is:

$$T_1 = T_0(1 - (\epsilon_1/f_{nominal})).$$

During the OFDM data symbols that occur after the long training symbols 16, four subcarriers are used for pilot tones. After removing the known binary phase shift key (BPSK) modulation of the pilot tones, the main phase of the 4 pilots is determined to estimate a residual carrier frequency offset, $E_n$, where n is the index of the OFDM symbol. For each OFDM symbol, the update of the carrier frequency offset and the sampling period is given by:

$$\Delta f_n = \Delta f_{n-1} + \beta \epsilon_n$$

$$T_n = T_{n-1}(1 - (\beta \epsilon_n/f_{nominal}))$$

Where $\beta$ is a loop parameter. This method is currently being used with a zero order hold after IFFT in the transmitter 30 (to model D/A).

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A channel estimator for a wireless network receiver, the channel estimator comprising:
    a plurality of first circuits, each of the plurality of first circuits configured to multiply a respective channel estimate by a corresponding frequency domain signal, wherein the channel estimates correspond to an orthogonal frequency division multiplexing signal received by the wireless network receiver;
    a second circuit configured to output a sum of results of multiplying the respective channel estimates by the corresponding frequency domain signals;
    a third circuit configured to calculate, based on the sum, a correction factor, wherein the correction factor corresponds to a complex number representation of the respective channel estimates; and a fourth circuit configured to output, based on the correction factor and a previously calculated channel estimate, an updated channel estimate corresponding to the orthogonal frequency division multiplexing signal received by the wireless network receiver.

2. The channel estimator of claim 1, wherein the channel estimates correspond to respective subcarriers of the orthogonal frequency division multiplexing signal received by the wireless network receiver.

3. The channel estimator of claim 1, wherein outputting the updated channel estimate includes multiplying the correction factor by the previously calculated channel estimate.

4. The channel estimator of claim 1, further comprising a plurality of fifth circuits, each of the plurality of fifth circuits configured to calculate absolute values of the respective channel estimates.

5. The channel estimator of claim 1, further comprising a fifth circuit configured to calculate, based on the correction factor, a carrier frequency offset associated with the orthogonal frequency division multiplexing signal received by the wireless network receiver.

6. The channel estimator of claim 3, wherein multiplying the correction factor by the previously calculated channel estimate compensates for common amplitude and phase error, caused by frequency offsets and phase noise, in the previously calculated channel estimate.

7. The channel estimator of claim 4, wherein, to calculate the correction factor, the third circuit is configured to calculate the correction factor based on the sum and further based on the absolute values.

8. The channel estimator of claim 5, wherein, to calculate the carrier frequency offset, the fifth circuit is configured to (i) determine an imaginary component of the correction factor, (ii) multiply the imaginary component of the correction factor by a predetermined constant, and (iii) add a previously calculated carrier frequency offset to a result of multiplying the imaginary component of the correction factor by the predetermined constant.

9. A method for operating a channel estimator for a wireless network receiver, the method comprising:

multiplying a plurality of respective channel estimates by a corresponding frequency domain signal, wherein the channel estimates correspond to an orthogonal frequency division multiplexing signal received by the wireless network receiver;

outputting a sum of results of multiplying the respective channel estimates by the corresponding frequency domain signals;

calculating, based on the sum, a correction factor, wherein the correction factor corresponds to a complex number representation of the respective channel estimates; and outputting, based on the correction factor and a previously calculated channel estimate, an updated channel estimate corresponding to the orthogonal frequency division multiplexing signal received by the wireless network receiver.

10. The method of claim 9, wherein the channel estimates correspond to respective subcarriers of the orthogonal frequency division multiplexing signal received by the wireless network receiver.

11. The method of claim 9, wherein outputting the updated channel estimate includes multiplying the correction factor by the previously calculated channel estimate.

12. The method of claim 9, further comprising calculating absolute values of the respective channel estimates.

13. The method of claim 9, further comprising calculating, based on the correction factor, a carrier frequency offset associated with the orthogonal frequency division multiplexing signal received by the wireless network receiver.

14. The method of claim 11, wherein multiplying the correction factor by the previously calculated channel estimate compensates for common amplitude and phase error, caused by frequency offsets and phase noise, in the previously calculated channel estimate.

15. The method of claim 12, wherein calculating the correction factor includes calculating the correction factor based on the sum and further based on the absolute values.

16. The method of claim 13, wherein calculating the carrier frequency offset includes (i) determining an imaginary component of the correction factor, (ii) multiplying the imaginary component of the correction factor by a predetermined constant, and (iii) adding a previously calculated carrier frequency offset to a result of multiplying the imaginary component of the correction factor by the predetermined constant.

\* \* \* \* \*